(No Model.)

F. W. ROBINSON.
COMBINED THRASHER AND SEPARATOR.

No. 251,951. Patented Jan. 3, 1882.

Witnesses.
Henry E. Robinson
Harry M. Yeo

Inventor.
F. W. Robinson

UNITED STATES PATENT OFFICE.

FRANCIS W. ROBINSON, OF RICHMOND, INDIANA.

COMBINED THRASHER AND SEPARATOR.

SPECIFICATION forming part of Letters Patent No. 251,951, dated January 3, 1882.

Application filed February 14, 1881. (No model.)

*To all whom it may concern:*

Be it known that I, FRANCIS W. ROBINSON, a citizen of the United States, residing at Richmond, in the county of Wayne and State of Indiana, have invented certain new and useful Improvements in Combined Thrashers and Separators; and I do hereby declare the following to be a full, clear, and exact description of the same, reference being made to the accompanying drawings, forming a part of this specification, and in which—

Figure 1:
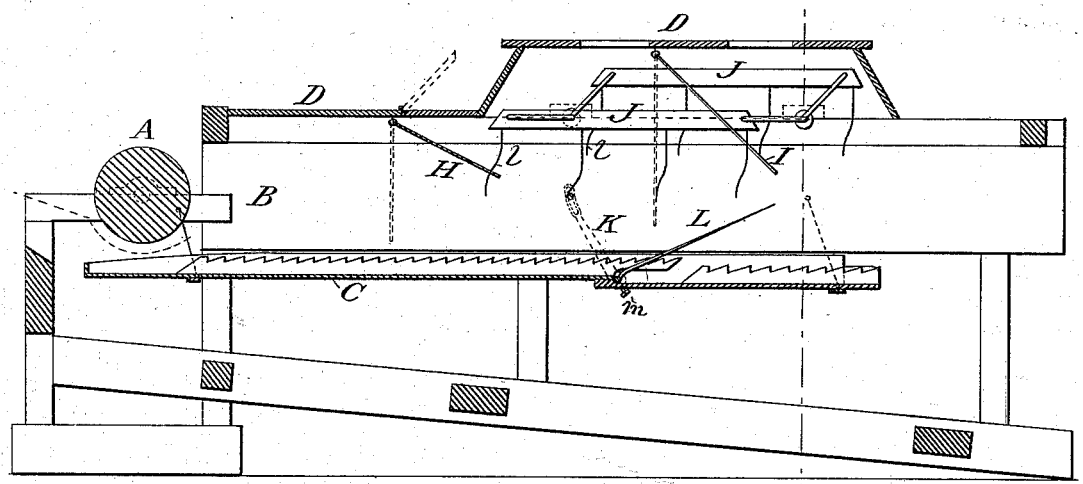
Figure 2:
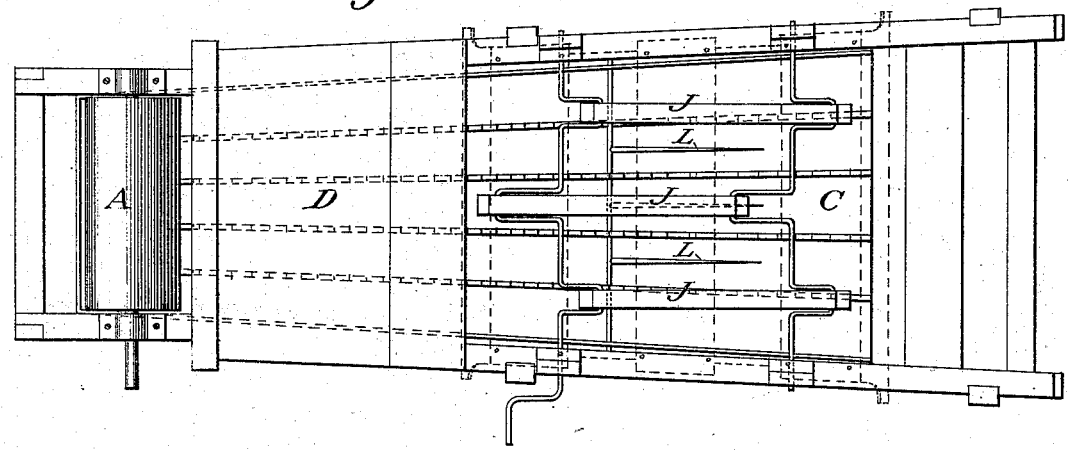
Figure 3:
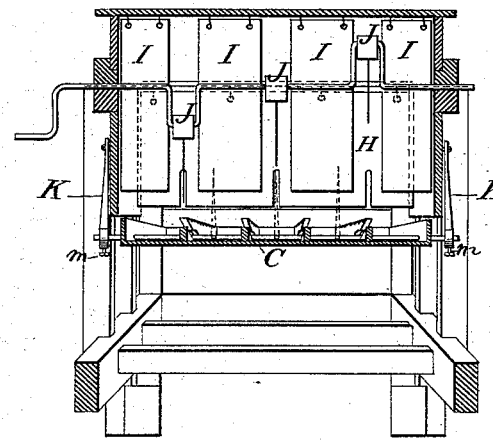

Figure 1 represents a longitudinal sectional elevation of my improved machine; Fig. 2, a top view or plan; Fig. 3, a transverse section.

From the revolving cylinder of a thrashing-machine the straw and grain is thrown back with such force as to require some means to stop or check it; otherwise, in starting the machine, and before it becomes filled with straw, the grain will fly out at the rear end of the machine. To obviate this defect a hanging apron is generally used, which is arranged in rear of the revolving cylinder, and rises to allow the accumulating straw to pass back and out of the machine. Experience has demonstrated that the straw, when damp or wet, is liable to pack and choke between the cylinder and apron, and frequently to wind around the cylinder.

The principal object of my invention is to prevent this choking and packing up of the straw between the cylinder and hanging apron, and to also prevent straw and lint from winding around the journals of the picker-bars arranged in rear of the hanging apron; and, further, to lessen the cost of construction and facilitate the repair of the machine; and to this end the invention consists in novel features of construction and combination and arrangement of parts, all as will be hereinafter fully described, and specifically designated in the claims.

Like letters of reference indicate like parts in the drawings.

In the drawings, A represents the thrashing-cylinder with concave and teeth, as in common use.

B represents a section of the frame of the machine, and C the vibrating carrier that receives the grain and straw, and which extends forward under the cylinder and concave; and D, the deck or covering of the machine.

H represents a shield or apron hinged to the deck or covering D, and slotted, as shown in Fig. 3, for the purpose of permitting the forward curved teeth, *l*, of the picker-bars J J J to reach through and beyond the apron in their forward vibrating or reciprocating movement, said picker-bars being mounted on crank-arms, and by means of which they are adapted to receive rising and falling movements as well as longitudinally vibrating or reciprocating movements.

The apron H may be made either in sections or slotted, as shown, and is arranged between the cylinder and concave and forward ends of the picker-bars, and in such relation to said picker-bars that when thrown into the inclined position by the accumulation of straw from the cylinder and concave the forward curved teeth of said picker-bars will project through and beyond the apron in the extreme forward vibrating or reciprocating movement of said bars, which alternately oscillate and carry forward the teeth above the straw, thence downward and backward, pulling the straw toward, under, and from the apron H. The apron H also shields the forward ends of the picker-bars and the journals of same from danger of winding with the straw or lint, which would otherwise choke the machine, and also prevents the choking up and packing of the straw between the cylinder and apron and the grain from flying out at the rear end of the machine. I also provide a sectional apron or shield, I, which extends across the machine about midway between the journals of the two crank-arms or shafts of the picker-bars, which is intended to aid in checking the flying grain and also shield the rear end journals of the picker-bars from winding straw or lint.

Heretofore to secure the cranks or arms K K to the rake-heads, and each crank or arm be set parallel to its mate on the opposite side of the machine, the ends of the rake-head bars have been squared, and in order to give them the proper angle to the crank and have them parallel with each other it has been necessary to twist the bar, which is a slow and expensive process, while in repairing the part in case of breakage the labor and expense are much increased, requiring the removal of the whole bar from the machine. To obviate these defects and permit the adjustments of the cranks K K relatively to each other, I secure said cranks to the rake-head by means of set-screws m m. By this means the cranks can be adjusted to the right or left, so as to give the fingers L of the rake-head the proper angle to the cranks. It will be observed that said rake-head is journaled to and moves with the vibrating carrier C, while, the upper ends of the crank-arms being fulcrumed to the sides of the machine, said rake-head, with its fingers L, will be vibrated so that the fingers are raised in the rearward movement of the carrier, thus raising the straw up to be caught by the teeth of the picker-bars, and lowered to readily pass under the straw in the return movement of the carrier.

I am aware that a slotted or sectional apron has been used in connection with picker-bars which extend through and forward of said apron, leaving openings above and below said picker-bars, through which the grain and lint may and does fly toward the rear end of the machine, while leaving the forward ends of the picker-bars exposed to the danger of winding with the straw and lint, and thus choking the machine. Such construction I distinctly disclaim as of my invention, as the above defects are entirely obviated by arranging the hinged and slotted apron forward of the picker-bars, so that they do not under any circumstances pass through the apron, but merely the curved and forward fingers of the picker-bars, which reach through the apron and draw back the straw without destroying the functions of the apron.

Having thus fully described my invention, what I claim as new, and desire to secure by Letters Patent, is—

1. In a thrasher and separator, the combination of the thrashing-cylinder, the picker-bars having curved front teeth, l l, and a sectional or slotted hinged apron or shield, H, arranged between thrashing-cylinder and concave and the forward ends of said picker-bars, substantially in the manner and for the purpose herein shown and described.

2. In a thrasher and separator, the combination of the thrashing-cylinder, the picker-bars, the sectional or slotted hinged apron or shield H, arranged between thrashing-cylinder and concave and the forward ends of said picker-bars, and the sectional apron or shield I, extending across the machine about midway of the crank arms or shafts of the picker-bars, substantially as and for the purposes herein shown and described.

3. In a thrasher and separator, the combination of a series of picker-bars, a vibrating carrier arranged under said picker-bars having a rake-head provided with lifting-fingers L, journaled thereto, and crank-arms K K, fulcrumed at their upper ends to the sides of the machine and adjustably connected at their lower ends to said rake-head, substantially as and for the purpose herein shown and described.

FRANCIS W. ROBINSON.

Witnesses:
HENRY E. ROBINSON,
HARRY M. YEO.